United States Patent
Haridass et al.

(10) Patent No.: US 9,541,971 B2
(45) Date of Patent: Jan. 10, 2017

(54) MULTIPLE LEVEL COMPUTER SYSTEM TEMPERATURE MANAGEMENT FOR COOLING FAN CONTROL

(71) Applicant: International Business Machines Corporation, Armonk, NY (US)

(72) Inventors: Anand Haridass, Bangalore (IN); Prasanna Jayaraman, Bangalore (IN); Tony E. Sawan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 557 days.

(21) Appl. No.: 13/930,902

(22) Filed: Jun. 28, 2013

(65) Prior Publication Data

US 2015/0005946 A1    Jan. 1, 2015

(51) Int. Cl.
  *G05B 15/02*    (2006.01)
  *G06F 1/20*    (2006.01)

(52) U.S. Cl.
  CPC .......... *G06F 1/206* (2013.01); *Y02B 60/1275* (2013.01)

(58) Field of Classification Search
  CPC ...... G05B 19/02; G06F 1/206; Y02B 60/1275
  USPC .. 700/275–278, 291, 295–300; 713/320–330
  See application file for complete search history.

(56) References Cited

U.S. PATENT DOCUMENTS

| | | | |
|---|---|---|---|
| 5,102,040 A | 4/1992 | Harvey | |
| 6,654,894 B2 | 11/2003 | Kaminski et al. | |
| 7,451,332 B2 * | 11/2008 | Culbert | G06F 1/206 713/300 |
| 7,483,270 B2 * | 1/2009 | Blake | 361/679.48 |
| 7,492,591 B1 * | 2/2009 | Aybay et al. | 361/695 |
| 7,505,820 B2 * | 3/2009 | Plivcic | H02J 1/14 307/43 |
| 7,628,024 B2 * | 12/2009 | Watakabe | F25B 49/02 361/695 |
| 8,374,730 B2 * | 2/2013 | Conroy | G06F 1/206 361/679.02 |
| 8,594,856 B2 * | 11/2013 | Alon | G05D 23/1931 62/186 |
| 8,788,866 B2 * | 7/2014 | Anderson | G06F 1/206 363/74 |

(Continued)

FOREIGN PATENT DOCUMENTS

GB    2481694 A    1/2012

OTHER PUBLICATIONS

Artman et al.; "Dell PowerEdge 1650: Rack Impacts on Cooling for High Density Servers"; Dell White Paper; Enterprise Systems Group (ESG); Aug. 2002.
Choi et al.; "Modeling and Managing Thermal Profiles for Rack-mounted Servers with ThermoStat"; IEEE; Copyright 2007 IEEE.
James Fulton; "Control of Server Inlet Temperature in Datacenters—A Long Overdue Strategy"; AFCO Systems Datacenter Resource Solutions.

(Continued)

*Primary Examiner* — M. N. Von Buhr
(74) *Attorney, Agent, or Firm* — Edward J. Wixted, III (57) ABSTRACT

In a method for designating cooling fan control management in a computing system, a processor causes one or more cooling fans to be managed by a first process, wherein the first process utilizes a first set of temperature sensors of a plurality of temperature sensors. A processor receives temperature data from a first set of temperature sensors. A processor determines a second process to manage the one or more cooling fans, based on the received temperature data from the first set of temperature sensors, wherein the second process utilizes a second set of temperature sensors of the plurality of temperature sensors.

16 Claims, 5 Drawing Sheets

(56) References Cited

U.S. PATENT DOCUMENTS

| | | | |
|---|---|---|---|
| 2006/0266510 A1 | 11/2006 | Nobashi | |
| 2007/0097636 A1 | 5/2007 | Johnson et al. | |
| 2007/0296408 A1* | 12/2007 | Liao | G05D 23/1931 324/224 |
| 2010/0228403 A1 | 9/2010 | Eto | |
| 2011/0035606 A1* | 2/2011 | Lovicott | G06F 1/206 713/300 |
| 2011/0176275 A1 | 7/2011 | Sato | |
| 2011/0303406 A1* | 12/2011 | Takeda et al. | 165/288 |
| 2012/0078420 A1* | 3/2012 | Jensen et al. | 700/275 |
| 2012/0096288 A1 | 4/2012 | Bates et al. | |
| 2012/0215359 A1 | 8/2012 | Michael et al. | |
| 2012/0261480 A1* | 10/2012 | Yuan | H05K 7/20836 236/51 |
| 2014/0277750 A1* | 9/2014 | Artman | G05B 15/02 700/275 |
| 2015/0005949 A1* | 1/2015 | Haridass | G06F 1/206 700/275 |

OTHER PUBLICATIONS

Hoffmann et al.; "Experimental Investigation of the Cooling Efficiency of Rack-Based Cooling Systems for IT-Equipment".

"Water-cooled cabinet for lateral attachment to server cabinets"; Manual CoolLoop; knurr enivronments for electronics.

"Remote-Junction Temperature-Controlled Fan-Speed Regulator with SMBus Interface"; Maxim Integrated Products; Copyright 2006 Maxim Integrated Products.

"Remote Temperature-Controlled Fan-Speed Regulator with SPI-Compatible Interface"; Maxim Integrated Products; Copyright 2002 Maxim Integrated Products.

Non-final Office Action, Dated Jan. 29, 2016, U.S. Appl. No. 14/025,971.

U.S. Appl. No. 14/025,971, filed Sep. 13, 2013; Entitled "Multiple Level Computer System Temperature Management"; pp. 1-33.

U.S. Appl. No. 14/025,971, Non-Final Rejection, Dated Jun. 13, 2016.

* cited by examiner

MULTIPLE LEVEL COMPUTER SYSTEM TEMPERATURE MANAGEMENT FOR COOLING FAN CONTROL

FIELD OF THE INVENTION

The present invention relates generally to the field of computing system temperature management, and more particularly to computing system cooling fan control.

BACKGROUND OF THE INVENTION

Servers generate heat from the operation of electrical components, such as processors and hard drives. A temperature range, or rated temperature, is generally defined for each device or component.

Cooling systems within a server or computer may include one or more cooling fans. For example, a computer may have a processor fan, a motherboard fan, a power supply fan, and/or a video card fan. Cooling systems are designed to dissipate heat within the computer system, so that the individual components continue to run at or below their maximum allowable temperature.

Cooling systems often rely on temperature data from within the computer to control cooling fans or other cooling methods, such as water or air conditioned based cooling. One or more temperature sensors may be placed within a server or computer. The one or more temperature sensors may communicate temperature information to the cooling system controller. Temperature sensors are often available on computer motherboards and video cards. The most widely available temperature readings come from the chipset, the central processing unit (CPU), the ambient, or area surrounding the computer or server, and from the power circuitry. Modern CPUs can report their own internal temperature. Multi-core CPUs are often able to report temperatures from each single core. Self-monitoring, analysis and reporting technology (S.M.A.R.T.) is a monitoring system for computer hard disk drives to detect and report on various indicators of reliability. Using S.M.A.R.T., hard disk temperature can be read.

SUMMARY

Aspects of embodiments of the present invention disclose a method, computer program product, and computing system for designating cooling fan control management in a computing system. A processor causes one or more cooling fans to be managed by a first process, wherein the first process utilizes a first set of temperature sensors of a plurality of temperature sensors. A processors receives temperature data from a first set of temperature sensors. A processor determines a second process to manage the one or more cooling fans, based on the received temperature data from the first set of temperature sensors, wherein the second process utilizes a second set of temperature sensors of the plurality of temperature sensors.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code/instructions embodied thereon.

Any combination of computer-readable media may be utilized. Computer-readable media may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of a computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on a user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer-implemented process such that the instructions which execute on the computer or other programmable apparatus provide processes for implementing the functions/acts specified in the flowchart and/or block diagram block or blocks.

The present invention will now be described in detail with reference to the Figures.

Figure 1:
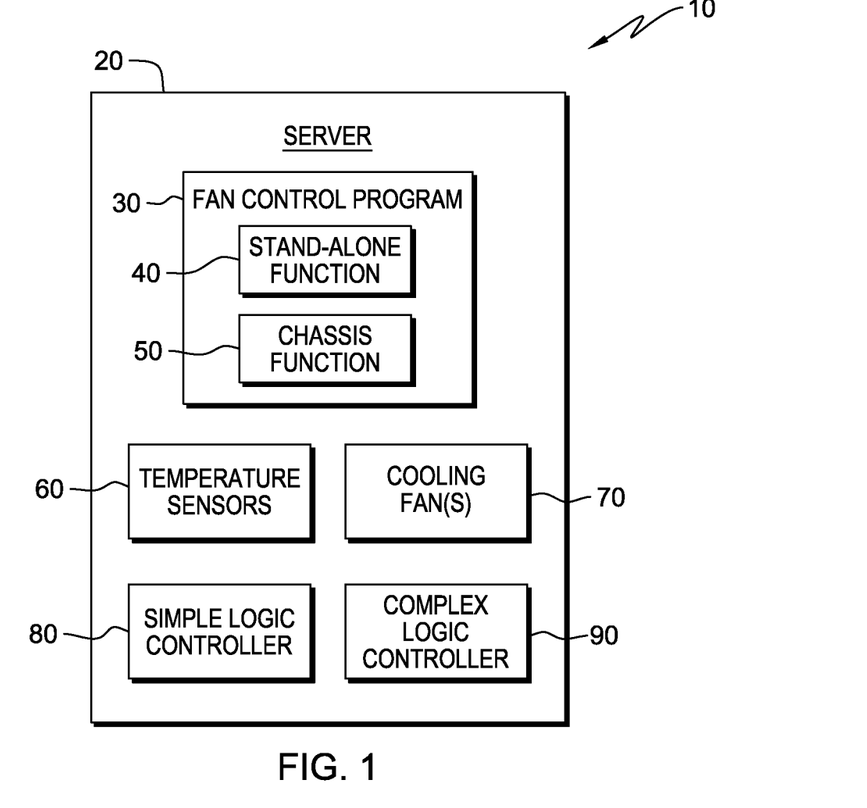
FIG. 1 depicts a diagram of a computing system in accordance with one embodiment of the present invention.

FIG. 1 depicts a diagram of computing system 10 in accordance with one embodiment of the present invention for determining cooling fan control management based upon temperature gradient data. FIG. 1 provides only an illustration of one embodiment and does not imply any limitations with regard to the environments in which different embodiments may be implemented.

In the depicted embodiment, computing system 10 includes server 20. Computing system 10 may also include a network, other servers, client computers, or other devices not shown.

Server 20 may be a management server, a web server, laptop computer, tablet computer, netbook computer, personal computer (PC), or a desktop computer. In general, server 20 may be any electronic device that contains one or more cooling fan(s) 70 and a plurality of temperature sensors 60. In one embodiment, server 20 may be a stand-alone server comprising a single computer. In another embodiment, server 20 may be a blade server, rack server, or other type of server in a chassis environment that contains multiple computers designed for rack mounting. Server 20 contains fan control program 30, stand-alone function 40, chassis function 50, simple logic controller 80, and complex logic controller 90.

Server 20 includes one or more cooling fan(s) 70. Cooling fan(s) 70 are fans inside, outside, or attached to, a computer case and are used for active cooling. Cooling fan(s) 70 may draw cool air into the case from the outside, expel warm air from the inside, or move air across a heat sink to cool a particular component. Cooling fan(s) 70 may include processor fans, motherboard fans, power supply fans, video card fans, and/or other types of cooling fans. Server 20 contains one or more cooling fan(s) 70 which may be located within the case of server 20, on the outside of the case of server 20, or near various components (e.g., processor, memory, power supply, etc.) within the case of server 20. In a chassis environment, additional cooling fan(s) 70 may be located on the chassis structure or on any of the blades, modules, or other components designed for rack mounting.

Server 20 includes a plurality of temperature sensors 60. Each of temperature sensors 60 can be any sensor or temperature identifying means capable of determining a temperature reading. Temperature sensors 60 are found in many computing devices and act to sound alarms when specified temperatures have been exceeded, and/or provide temperature information for fan control management. The most widely available temperatures are from the chipset, the CPU, the ambient, or area surrounding the computer or server, and from the power circuitry. The plurality of temperature sensors 60 may be located on the motherboard, power supply, video card, or at the inlet, outlet or other location within server 20. In a chassis server embodiment, additional temperature sensors 60 may be located on the rack or chassis, and/or near various nodes or components within server 20, such as a blade, module, or other component designed for rack mounting. Various components within server 20 may have independent temperature reporting capabilities. For example, modern central processing units (CPUs) can report their own internal temperature. Multi-core CPUs are often able to report temperatures from each single core. Self-monitoring, analysis and reporting technology (S.M.A.R.T.) is a monitoring system for computer hard disk drives to detect and report on various indicators of reliability, in the hope of anticipating failures. Using S.M.A.R.T., hard disk temperature can be read.

Server 20 contains simple logic controller 80. Simple logic controller 80 may be firmware, software, or circuitry. In one embodiment, simple logic controller 80 is a flexible service processor (FSP). A FSP is firmware that provides diagnostics, initialization, configuration, run-time error detection and correction. Simple logic controller 80 may run the simple logic process described below. In one embodiment, simple logic controller 80 runs a process that may require less energy or processing power to operate than complex logic controller 90.

Server 20 contains complex logic controller 90. Complex logic controller 90 may be firmware, software, circuitry, a management controller or a thermal power management device (TPMD). A TPMD resides on the processor planar and is responsible for thermal protection of the processor cards. Complex logic controller 90 may run the complex logic process described below. In one embodiment, complex logic controller 90 runs a process that may require more energy or processing power to operate than simple logic controller 80.

Server 20 contains fan control program 30. Fan control program 30 executes on server 20 and is capable of executing stand-alone function 40 and chassis function 50 to determine cooling fan control management based upon temperature gradient data. Temperature gradient data may include the direction and rate at which the temperature changes the most rapidly around a particular location. Temperature gradient data may also include changes in temperature between multiple temperature sensors. Fan control program 30 operates to receive temperature gradient data from a plurality of temperature sensors 60 within server 20, and use the received temperature gradient data to determine whether a simple or complex logic controller is required to manage the one or more cooling fan(s) 70. In one embodiment, fan control program 30 includes two functions: stand-alone function 40 and chassis function 50.

Stand-alone function 40 operates in an embodiment where server 20 is a stand-alone server or another single computing device. Stand-alone function 40 operates to receive temperature gradient data from a plurality of temperature sensors 60 within server 20, and use the received temperature gradient data to determine whether simple or complex logic is required to manage the one or more cooling fan(s) 70.

In lower server resource utilization scenarios, the temperature gradient (i.e., which direction and at what rate the temperature changes the most rapidly around a particular location) or temperature change within a stand-alone server may be low. The change in temperature at the inlet and outlet (e.g., atmospheric air inlet and outlet, or cooling fluid inlet and outlet, etc.) of server 20 may be low enough that simple logic on a more energy efficient controller is all that is necessary to control the fan speed (or, e.g., coolant pump speed in an embodiment utilizing liquid cooling, etc.) and maintain acceptable internal component temperature. As the change in temperature at the inlet and outlet of server 20 increases, the simple logic may cause the fan speed to increase. If the temperature difference continues to increase, the simple logic may monitor subsystem sensors, such as processor or memory temperature sensors, in order to more effectively manage the temperature of the system. In one embodiment, when compared to the complex logic, the simple logic may monitor the plurality of temperature sensors 60 on a less frequent basis. In another embodiment, the simple logic may monitor a fewer number of the plurality of temperature sensors 60 as compared to the complex logic.

Above a temperature threshold, or simple logic control threshold, stand-alone function 40 may transfer control of cooling fan(s) 70 to complex logic controller 90. In an exemplary embodiment, complex logic controller 90 will only be turned on or otherwise activated when stand-alone function 40 determines that the simple logic control threshold within server 20 has been exceeded, and when the simple logic control threshold is no longer exceeded, simple logic controller 80 will resume control of cooling fan(s) 70, and complex logic controller 90 will be shut down or otherwise deactivated. Deactivating complex logic controller 90 when not in use may allow for energy savings within server 20. When complex logic controller 90 is managing cooling fan(s) 70 the complex logic may monitor more, as compared to the simple logic, or all of the plurality of temperature sensors 60 within server 20. The complex logic may also monitor the plurality of temperature sensors 60 on a more frequent basis than the simple logic. In one embodiment, stand-alone function 40 will monitor the complex logic and move cooling fan management to the simple logic if any failures have been detected within the complex logic or mechanism that controls the complex logic.

Chassis function 50 operates when server 20 is a multiple computer, or chassis-type server. Chassis function 50 operates to receive temperature gradient data, at the rack, node, and subsystem (e.g., processor, memory, etc.) levels, from a plurality of temperature sensors 60 within server 20, and use the temperature gradient data to determine whether simple or complex logic is required to manage the one or more cooling fan(s) 70. For example, at the rack level, chassis function 50 may receive temperature gradient data between the inlet and outlet of the chassis of server 20. At the node level, chassis function 50 may receive temperature gradient data at the inlet and outlet of each node, or across multiple nodes. At the subsystem level, chassis function 50 may receive temperature gradient data between any of the following subsystem components: the inlet, outlet, processor, or memory. In low utilization scenarios, the temperature gradient and/or temperature change within the chassis may be low. The change in temperature among a plurality of temperature sensors 60 located on the chassis of server 20 may be low enough that a simple logic using chassis temperature gradient data is all that is necessary to control fan speed and maintain acceptable internal temperature among server 20 components. Above a certain temperature threshold, or chassis control threshold, a simple logic using both chassis and node temperature gradient data may be necessary to control the fan speed and maintain acceptable internal temperature. If node temperature gradient data indicates that individual nodes have temperatures above another temperature threshold, or node control threshold, the simple logic will receive subsystem temperature gradient data of affected nodes in order to assist the simple logic with fan control management. Similar to as described with regards to stand-alone function 40, the simple logic in a chassis environment may monitor a plurality of temperature sensors 60 on a less frequent basis, or may monitor fewer of the plurality of temperature sensors 60 as compared to the complex logic. The monitoring frequency and the number of the plurality of temperature sensors 60 monitored may vary based on whether or not the chassis control or node control thresholds have been exceeded.

Above another temperature threshold, or a simple logic control threshold, control of cooling fan(s) 70 may be transferred to complex logic controller 90. In an exemplary embodiment, complex logic controller 90 may be shut down or deactivated when not in use. Shutting down or deactivating complex logic controller 90 may create energy savings in operating server 20. When complex logic controller 90 is managing cooling fan(s) 70, the complex logic may monitor more, as compared to the simple logic, or all of the plurality of temperature sensors 60 within server 20. The complex logic may also monitor the plurality of temperature sensors 60 on a more frequent basis, as compared to the simple logic. In one embodiment, chassis function 50 will monitor the complex logic and move cooling fan management to the simple logic if any failures have been detected within the complex logic or mechanism that controls the complex logic.

Fan control program 30 may have a number of thresholds. In the previous embodiments, a node control threshold, chassis control threshold, and simple logic control threshold have been discussed. Each threshold, or additional thresholds, may vary based upon the temperature constraints up the components and/or arrangement of components within the computing device. In one embodiment, each threshold may be determined by equating lab data at multiple power consumptions and at different cooling fan(s) 70 speeds against temperature gradient data, such as multiple inlet and outlet temperatures at different places, or across various subsystems. Threshold information may be stored as data on a disk drive, flash drive, or alternatively may be stored to the electrically erasable programmable read-only memory (EEPROM). EEPROM is a type of memory used in computing devices to store small amounts of data that must be saved when power is removed.

Figure 5:
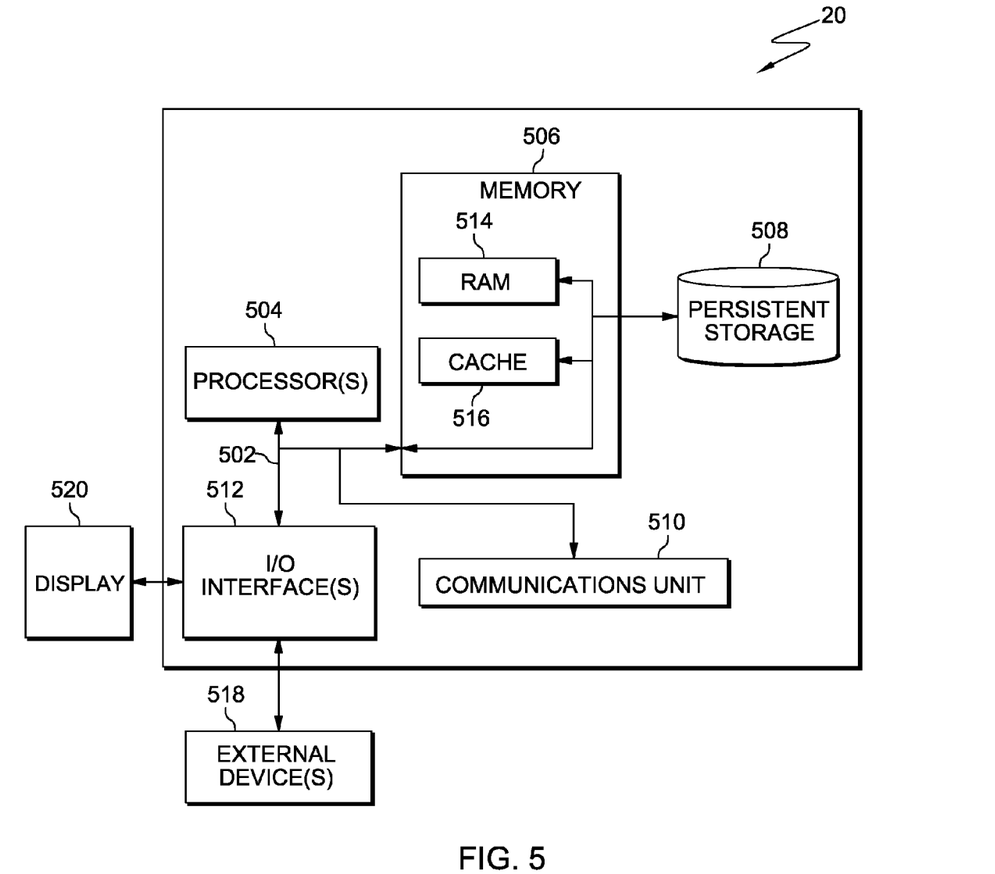
FIG. 5 is a block diagram of internal and external components of the server of FIG. 1 in accordance with one embodiment of the present invention.

Server 20 may include components as depicted and described in further detail with respect to FIG. 5.

Figure 2:
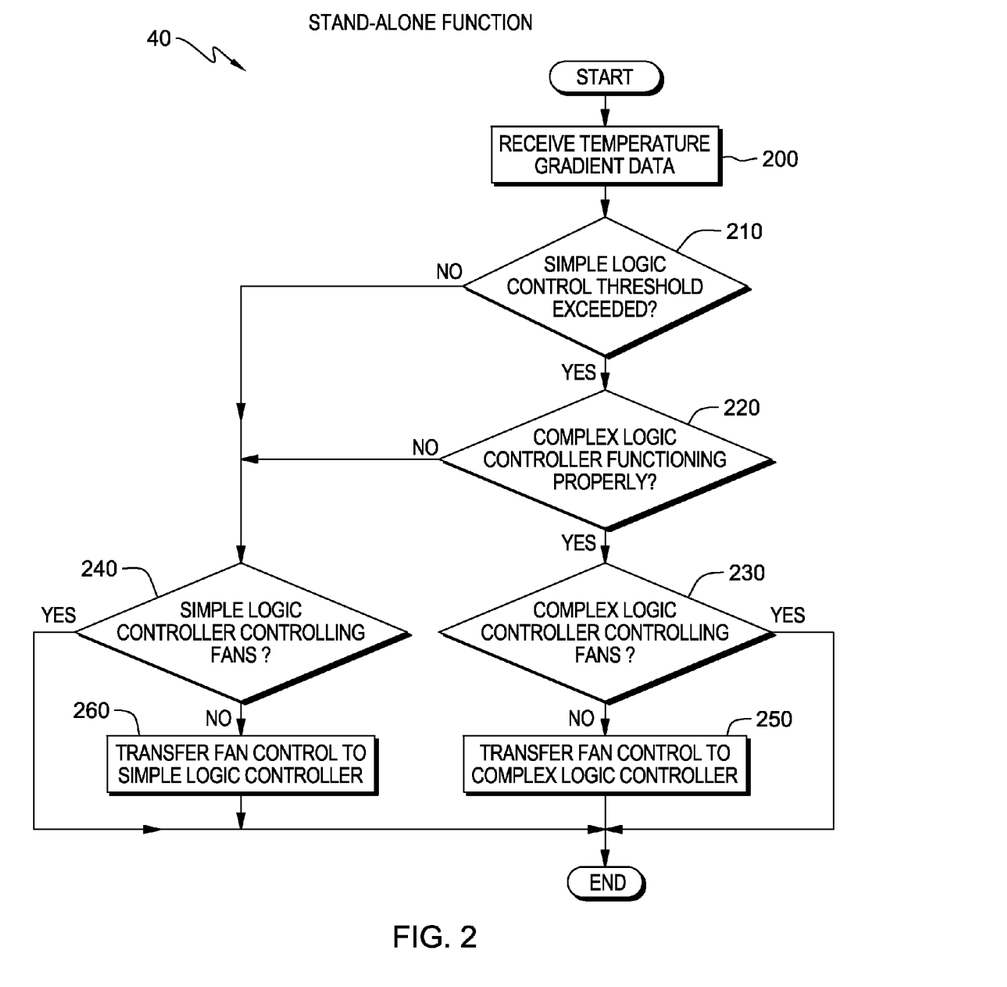
FIG. 2 depicts a flowchart of the steps of a fan control program executing a stand-alone function within the computing system of FIG. 1, for determining cooling fan control management based upon temperature gradient data within a stand-alone server.

FIG. 2 depicts a flowchart of the steps of stand-alone function 40 of fan control program 30 executing within computing system 10 of FIG. 1, for determining cooling fan control management based upon temperature gradient data, in accordance with one embodiment of the present invention. Stand-alone function 40 of fan control program 30 may run when server 20 is a stand-alone or single computer server.

In one embodiment, stand-alone function 40 of fan control program 30 will run as server 20 boots and periodically as the system runs. Stand-alone function 40 will determine whether cooling fan(s) 70 of server 20 should be controlled by simple logic controller 80 or complex logic controller 90. In an exemplary embodiment, simple logic controller 80 consumes less energy during operation than complex logic controller 90.

In one embodiment, as server 20 boots, complex logic controller 90 may initially control cooling fan(s) 70. If stand-alone function 40 receives temperature gradient data below a threshold (i.e., a simple logic control threshold), stand-alone function 40 may transfer cooling fan(s) 70 control to simple logic controller 80. In addition, stand-alone function 40 may shut down, place into power save mode, or otherwise decrease the energy consumption requirements for complex logic controller 90 when the controller is inactive.

In step 200, stand-alone function 40 receives temperature gradient data. Temperature gradient data may include temperature information from a plurality of temperature sensors 60. In one embodiment, the temperature gradient data received may be a change in temperature between temperature sensors located at the inlet and outlet of server 20. In another embodiment additional temperature sensors may be monitored.

In decision 210, stand-alone function 40 determines, based on the temperature gradient data received (step 200), whether a simple logic control threshold has been exceeded. Stand-alone function 40 determines whether a simple logic control threshold has been exceeded by comparing the received temperature gradient data (step 200) to stored threshold information. Threshold information may be stored as data on a disk drive, flash drive, or alternatively may be stored to the electrically erasable programmable read-only memory (EEPROM). EEPROM is a type of memory used in computing devices to store small amounts of data that must be saved when power is removed. In one embodiment, the simple logic control threshold is a specific temperature at one or more of the plurality of temperature sensors 60. For example, the simple logic control threshold may be a specific temperature at the temperature sensor located near the outlet of server 20. In another embodiment, the simple logic control threshold is a change in temperature between two or more of the plurality of temperature sensors 60. For example, the simple logic control threshold may be a specific change in temperature between temperature sensors 60 located near the inlet and outlet of server 20. In yet another embodiment, the simple logic control threshold is a change in temperature at one of the plurality of temperature sensor 60 or between multiple of the plurality of temperature sensors 60 over a period of time, e.g., a rapid increase in temperature between the inlet and outlet temperature sensors 60.

If stand-alone function 40 determines that the simple logic control threshold has not been exceeded (decision 210, no branch), stand-alone function 40 determines if cooling fan(s) 70 are being controlled by simple logic controller 80 (decision 240). Stand-alone function 40 may determine that cooling fan(s) 70 are being controlled by simple logic controller 80 (decision 240) by monitoring simple logic controller 80 for fan control activity. The simple logic may be firmware, software, or circuitry. In one embodiment, the simple logic may be a flexible service processor (FSP). A FSP is firmware that provides diagnostics, initialization, configuration, run-time error detection and correction. If stand-alone function 40 determines that cooling fan(s) 70 are being controlled by simple logic controller 80 (decision 240, yes branch), the function is complete. The simple logic may manage control of cooling fan 70 according to the needs of the system. For example, below a certain temperature, the simple logic may monitor only the inlet and outlet of the stand-alone server system. As the change in temperature between the inlet and outlet increases, the simple logic may cause cooling fan(s) 70 to increase fan speed. At a designated temperature level or threshold, the simple logic may begin to monitor temperature sensors 60 located around different subsystems within server 20. Such subsystems may include the processor, memory, or input/output (I/O) of server 20. When this occurs, the simple logic may monitor gradients between different subsystems. For example, the simple logic may monitor the gradient between the inlet temperature sensor and the processor out temperature sensor, or between the processor out temperature sensor and the memory out temperature sensor.

If stand-alone function 40 determines that cooling fan(s) 70 are not being controlled by simple logic controller 80 (decision 240, no branch), stand-alone function 40 will transfer fan control to simple logic controller 80 (step 260). In one embodiment, stand-alone function 40 may transfer fan control to simple logic controller 80 by sending a command to initialize the simple logic. Once stand-alone function 40 has transferred fan control, the function is complete.

In decision 210, if stand-alone function 40 determines that the simple logic control threshold has been exceeded (decision 210, yes branch), stand-alone function 40 determines if complex logic controller 90 is functioning properly (decision 220). Stand-alone function 40 may determine if complex logic controller 90 is functioning properly by monitoring the signals and/or failure notifications sent by complex logic controller 90. The complex logic may be more complex than the simple logic. For example, the complex logic may monitor more temperature sensors 60, and may monitor temperature sensors 60 on a more frequent basis than the simple logic. Complex logic controller 90 may be a microcontroller, a management controller, firmware, software, or circuitry. In one embodiment, the complex logic is controlled by a thermal power management device (TPMD). A TPMD resides on the processor planar and is responsible for thermal protection of the processor cards. In one embodiment, complex logic controller 90 may require more energy or processing power than simple logic controller 80.

If stand-alone function 40 determines that complex logic controller 90 is not functioning properly (decision 220, no branch), stand-alone function 40 will determine if cooling fan(s) 70 are being controlled by simple logic controller 80 (decision 240). Stand-alone function 40 may determine that cooling fan(s) 70 are being controlled by simple logic controller 80 (decision 240) by monitoring simple logic controller 80 for fan control activity. If simple logic controller 80 is controlling cooling fan(s) 70 (decision 240, yes branch), the function is complete. If simple logic controller 80 is not controlling cooling fan(s) 70 (decision 240, no branch), stand-alone function 40 will transfer fan control to simple logic controller 80 (step 260). Once stand-alone function 40 has transferred control of cooling fan(s) 70, the function is complete.

If stand-alone function 40 determines that complex logic controller 90 is functioning properly (decision 220, yes branch), stand-alone function 40 will determine if cooling fan(s) 70 are being controlled by complex logic controller 90 (decision 230). Stand-alone function 40 may determine that cooling fan(s) 70 are being controlled by complex logic controller 90 (decision 230) by monitoring simple logic controller 80 for fan control activity. If complex logic controller 90 is controlling cooling fan(s) 70 (decision 230, yes branch), the function is complete. If complex logic controller 90 is not controlling cooling fan(s) 70 (decision 230, no branch), stand-alone function 40 will transfer control of the one or more cooling fan(s) 70 to complex logic controller 90. Once stand-alone function 40 has transferred control of cooling fan(s) 70 to complex logic controller 90, the function is complete.

In an exemplary embodiment, if stand-alone function 40 determines that neither complex logic controller 90, nor simple logic controller 80 are functioning properly, stand-alone function 40 will cause cooling fan(s) 70 to ramp up to maximum speed and instruct other controllers present in server 20 to determine whether or not the system is to be shut down.

Figure 3:
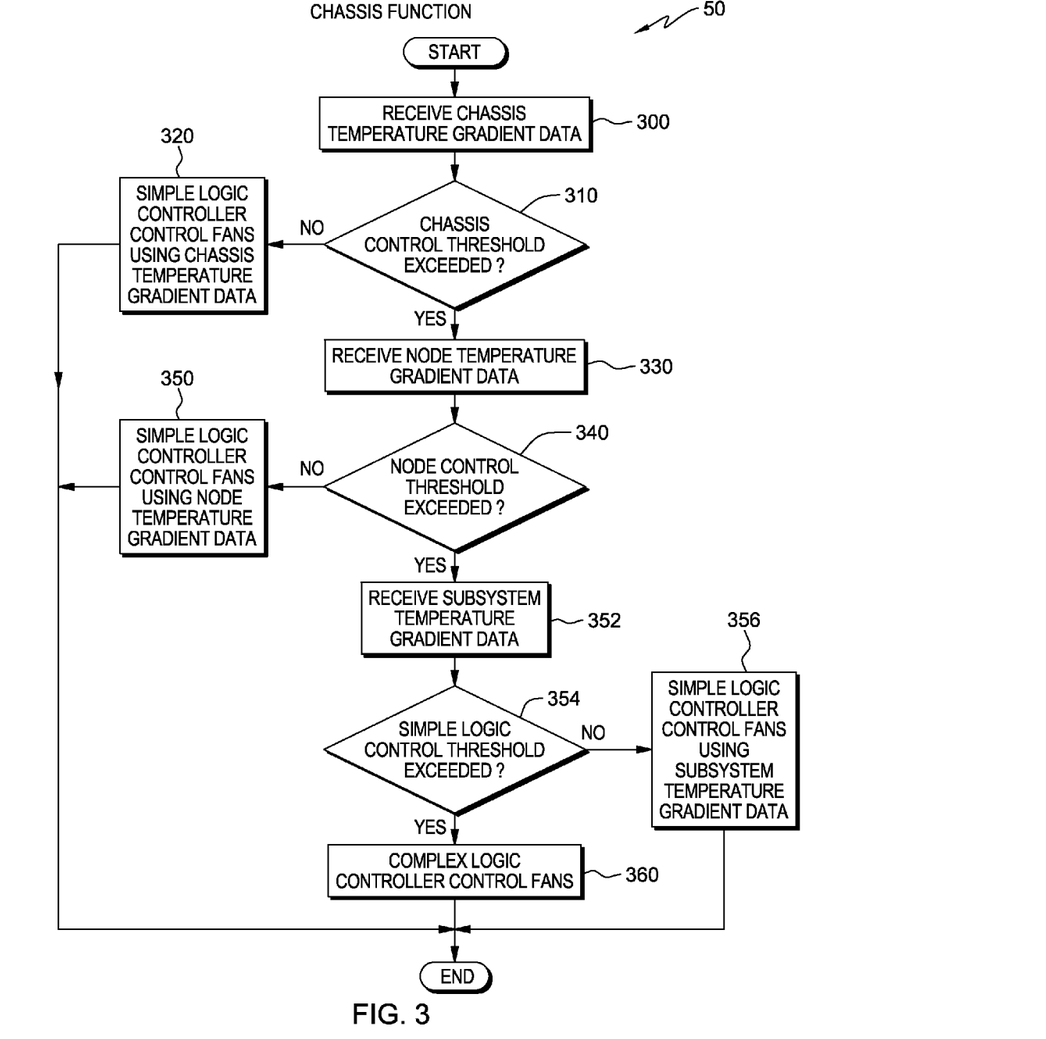
FIG. 3 depicts a flowchart of the steps of a fan control program executing a chassis function within the computing system of FIG. 1, for determining cooling fan control management based upon temperature gradient data within a chassis-type server.

FIG. 3 depicts a flowchart of the steps of chassis function 50 of fan control program 30 executing within computing system 10 of FIG. 1, for determining cooling fan control management based upon temperature gradient data, in accordance with another embodiment of the present invention. Chassis function 50 of fan control program 30 may run when server 20 is a chassis based server or blade server.

In one embodiment, chassis function 50 of fan control program 30 will run when server 20 boots and periodically as computing system 10 operates. For example, chassis function 50 may run initially at boot, and then may run again every time a specified period of time has passed. Chassis function 50 will determine whether cooling fan(s) 70 of server 20 should be controlled by simple or complex logic controllers. In addition, chassis function 50 will determine whether the chassis, node, or subsystem (e.g., processor, memory) temperature gradient data should be used by simple logic controller 80 to control cooling fan(s) 70.

In one embodiment, as server 20 boots, complex logic controller 90 may initially control cooling fan(s) 70. If chassis function 50 receives temperature gradient data below a threshold (i.e., a simple logic control threshold), chassis function 50 may transfer cooling fan(s) 70 control to simple logic controller 80. In addition, chassis function 50 may shut down, place into power save mode, or otherwise decrease the energy consumption requirements for complex logic controller 90 when the controller is inactive.

In step 300, chassis function 50 receives chassis temperature gradient data. Chassis temperature gradient data may include temperature information from the plurality of temperature sensors 60 located on the chassis or rack. The plurality of temperature sensors 60 located on the chassis or rack may be located at the inlet and outlet of the chassis or rack, and may also be located elsewhere along the chassis or rack. In one embodiment, the chassis temperature gradient data received may be a change in temperature between temperature sensors located at the inlet and outlet of the chassis or rack. In another embodiment the chassis temperature gradient data may be received from additional temperature sensors on the chassis or rack.

In decision 310, chassis function 50 determines, using the chassis temperature gradient data received (step 300), whether a chassis control threshold has been exceeded. Chassis function 50 determines whether a chassis control threshold has been exceeded by comparing the received temperature gradient data (step 300) to stored threshold information. As previously discussed, threshold information may be stored as data on a disk drive, flash drive, or alternatively may be stored to the EEPROM. In one embodiment, the chassis control threshold is a specific temperature at one of the plurality of temperature sensors 60 located on the chassis. For example, the chassis control threshold may be a specific temperature at the temperature sensor located near the outlet of the chassis of server 20. In another embodiment, the chassis control threshold is a change in temperature between multiple of the plurality of temperature sensors 60 located on the chassis. For example, the chassis control threshold may be a specific change in temperature between temperature sensors 60 located at the inlet and outlet of server 20. In yet another embodiment, the chassis control threshold is a change in temperature at one or more of the plurality of temperature sensor 60 located on the chassis or between multiple of the plurality of temperature sensors 60 located on the chassis over a period of time, e.g., a rapid increase in temperature between the inlet and outlet temperature sensors for the chassis of server 20.

If chassis function 50 determines that the chassis control threshold is not exceeded (decision 310, no branch), simple logic controller 80 will control cooling fan(s) 70 using received chassis temperature gradient data (see step 300). Chassis temperature gradient data may indicate the difference in temperature between the inlet and outlet temperatures of the chassis of server 20. Similar to the simple logic discussed in FIG. 2, the simple logic may increase fan speed in response to increase temperatures in the chassis temperature gradient data. The simple logic may be firmware, software, or circuitry. In one embodiment, the simple logic may be controlled by a flexible service processor (FSP). A FSP is firmware that provides diagnostics, initialization, configuration, run-time error detection and correction. In another embodiment, the simple logic may be controlled by a chassis management module (CMM). A CMM is a module that configures and manages all installed chassis components. If simple logic controller 80 is not already controlling cooling fan(s) 70 using chassis temperature gradient data, chassis function 50 will transfer control of cooling fan(s) 70 to simple logic controller 80 and the function will be complete. Chassis function 50 may transfer control of cooling fan(s) 70 to simple logic controller 80 by sending a command to initialize the simple logic.

In decision 310, if chassis function 50 determines that the chassis control threshold has been exceeded (decision 310, yes branch), then chassis function 50 receives node temperature gradient data (step 330). Chassis function 50 may determine that the chassis control threshold has been exceeded (decision 310, yes branch) by comparing the received chassis temperature gradient data (step 300) to stored threshold information. As previously discussed, threshold information may be stored as data on a disk drive, flash drive, or alternatively may be stored to the EEPROM. Node temperature gradient data may include temperature information from the plurality of temperature sensors 60 located on or within the blades, nodes, or modules of server 20. The plurality of temperature sensors 60 may be located at the inlet and outlet of each individual node and may also be located within individual nodes. In one embodiment, node temperature gradient data received may include changes in temperature between temperature sensors located at the inlets and outlets of individual nodes within server 20. In another embodiment node temperature gradient data may be received from additional temperature sensors on or within each node. Node temperature gradient data may further include temperature sensor information from temperature sensors 60 located on or within the chassis.

In decision 340, chassis function 50 determines, based on the node temperature gradient data received (step 330), whether a node control threshold has been exceeded. Chassis function 50 may determine that the node control threshold has been exceeded (decision 340, yes branch) by comparing the received node temperature gradient data (step 330) to stored threshold information. As previously discussed, threshold information may be stored as data on a disk drive, flash drive, or alternatively may be stored to the EEPROM. In one embodiment, the node control threshold is a specific temperature at one of temperature sensors 60. For example, the node control threshold may be a specific temperature at the temperature sensor located near the outlet of a node within server 20. In another embodiment, the node control threshold is a change in temperature between multiple of a plurality of temperature sensors 60. For example, the node control threshold may be a specific change in temperature between temperature sensors 60 located near the inlet and outlet of the node within server 20. In yet another embodiment, the node control threshold is a change in temperature at one or more of the plurality of temperature sensor 60 or between multiple of the plurality of temperature sensors 60, e.g., a rapid increase in temperature between the node inlet and the node outlet temperature sensors 60. Typically, a node control threshold value will be greater than a chassis control threshold value if the monitored threshold is of the same type. However, the node control threshold may examine different and additional sensors than the chassis control threshold, and may do so at a greater frequency.

If chassis function 50 determines that the node control threshold has not been exceeded (decision 340, no branch), simple logic controller 80 will control cooling fan(s) 70 using received node temperature gradient data (step 350). Node temperature gradient data may indicate the difference in temperature between the inlet and outlet temperatures of the various nodes within server 20. In one embodiment, if simple logic controller 80 is unable to receive temperature gradient data from a particular node, possibly due to a temperature sensor read problem, simple logic controller may control cooling fan(s) 70 using temperature gradient data from nodes adjacent to the particular node. As previously discussed, the simple logic may be firmware, software, or circuitry. In one embodiment, the simple logic may be controlled by a flexible service processor (FSP). A FSP is firmware that provides diagnostics, initialization, configuration, run-time error detection and correction. In another embodiment, the simple logic may be controlled by a chassis management module (CMM). A CMM is a module that configures and manages all installed chassis components. If simple logic controller 80 is not already controlling cooling fan(s) 70 using node temperature gradient data, chassis function 50 will transfer control of cooling fan(s) 70 to simple logic controller 80 and the function will be complete.

Chassis function 50 may transfer control of cooling fan(s) 70 to simple logic controller 80 by sending a command to initialize the simple logic.

In decision 340, if chassis function 50 determines that the node control threshold has been exceeded (decision 340, yes branch), chassis function 50 receives subsystem temperature gradient data (step 352). Chassis function 50 may determine that the node control threshold has been exceeded (decision 340, yes branch) by comparing the received node temperature gradient data (step 330) to stored threshold information. As previously discussed, threshold information may be stored as data on a disk drive, flash drive, or alternatively may be stored to the EEPROM. Subsystem temperature gradient data received may include temperature information from the plurality of temperature sensors 60 located on or within the computer components of server 20, such as processors, memory, and I/O. In one embodiment, subsystem temperature gradient data received may include changes in temperature between temperature sensors located at the inlet and processor of individual nodes within server 20. In another embodiment subsystem temperature gradient data may be between the memory and outlet of individual nodes within server 20. Subsystem temperature gradient data may further monitor temperature sensors horizontally or vertically in order to compare temperature information across multiple nodes. In an exemplary embodiment, subsystem temperature gradient data will only be received for individual nodes that have node temperature gradient data above the node control threshold.

In decision 354, chassis function 50 determines, based on the subsystem temperature gradient data received (step 353), whether a simple logic control threshold has been exceeded. Chassis function 50 may determine that the simple logic control threshold has been exceeded (decision 354, yes branch) by comparing the received subsystem temperature gradient data (step 352) to stored threshold information. As previously discussed, threshold information may be stored as data on a disk drive, flash drive, or alternatively may be stored to the EEPROM. In one embodiment, the simple logic control threshold is a specific temperature at one of temperature sensors 60. For example, the simple logic control threshold may be a specific temperature at the temperature sensor located near a particular component within a node, such as the processor or memory. In another embodiment, the simple logic control threshold is a change in temperature between multiple of a plurality of temperature sensors 60. For example, the simple logic control threshold may be a specific change in temperature between temperature sensors 60 located near the inlet and processor of a node, or near the memory and outlet of a node, within server 20. In yet another embodiment, the threshold is a change in temperature at one or more of a plurality of temperature sensor 60 or between multiple of a plurality of temperature sensors 60, e.g., a rapid increase in temperature between the processor sensor and memory sensor within a node. Typically, a simple logic control threshold value will be greater than a chassis control threshold value if the monitored threshold is of the same type. However, the simple logic control threshold may examine different and additional sensors than the chassis control threshold, and may do so at a greater frequency.

If chassis function 50 determines that the simple logic control threshold is not exceeded (decision 354, no branch), simple logic controller 80 will control cooling fan(s) 70 using received subsystem temperature gradient data (step 356). As previously discussed, the simple logic may be controlled by firmware, software, or circuitry. In one embodiment, the simple logic may be a flexible service processor (FSP). A FSP is firmware that provides diagnostics, initialization, configuration, run-time error detection and correction. In another embodiment, the simple logic may be controlled by a chassis management module (CMM). A CMM is a module that configures and manages all installed chassis components. If simple logic controller 80 is not already controlling cooling fan(s) 70 using subsystem temperature gradient data, chassis function 50 will transfer control of cooling fan(s) 70 to simple logic controller 80 and the function will be complete. Chassis function 50 may transfer control of cooling fan(s) 70 to complex logic controller 90 by sending a command to initialize the simple logic.

If chassis function 50 determines that the simple logic control threshold has been exceeded (decision 354, yes branch), chassis function 50 will cause complex logic controller 90 to control cooling fan(s) 70 (step 360). Similar to FIG. 2, the complex logic may be more complex than the simple logic. For example, the complex logic may monitor additional temperature sensors of the plurality of temperature sensors 60, and may monitor temperature sensors 60 on a more frequent basis in order to control the one or more cooling fan(s) 70. Complex logic controller 90 may be a microcontroller, a management controller, firmware, software, or circuitry. In one embodiment, the complex logic is controlled by a thermal power management device (TPMD). A TPMD resides on the processor planar and is responsible for thermal protection of the processor cards. In one embodiment, complex logic controller 90 may require more energy or processing power than simple logic controller 80.

Similar to FIG. 2 (not shown in FIG. 3), if chassis function 50 determines that complex logic controller 90 is not functioning properly, chassis function 50 will transfer control of cooling fan(s) 70 to simple logic controller 80, if simple logic controller 80 is not already controlling cooling fan(s) 70, and cause simple logic controller 80 to control cooling fan(s) 70 using node temperature gradient data. Chassis function 50 may determine that complex logic controller 90 is not functioning properly by monitoring the signals and/or failure notifications sent by complex logic controller 90. Once simple logic controller 80 has control of cooling fan(s) 70, the function is complete.

In an exemplary embodiment, if chassis function 50 determines that neither complex logic controller 90, nor simple logic controller 80 are functioning properly, chassis function 40 will cause cooling fan(s) 70 to ramp up to maximum speed and instruct other controllers present in server 20 to manage whether or not the system is to be shut down.

Figure 4:
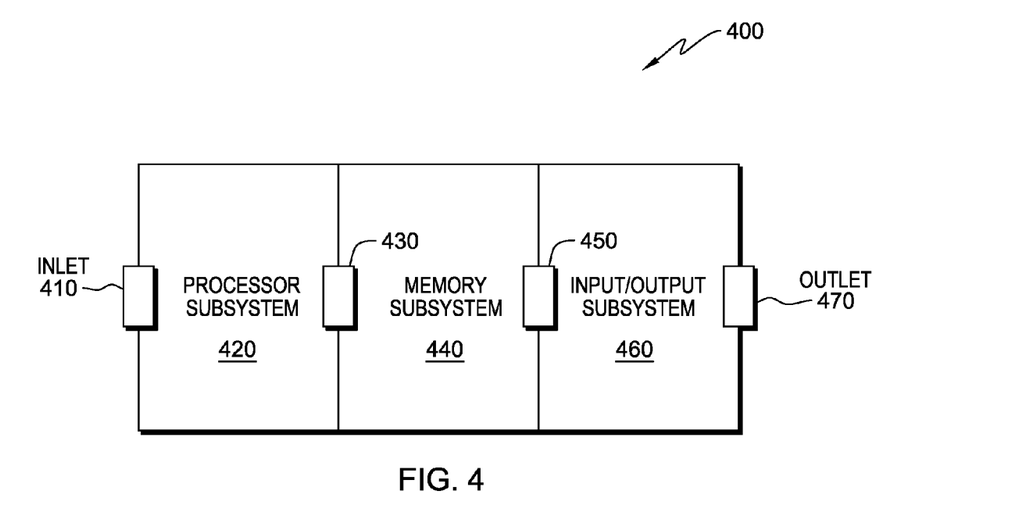
FIG. 4 is a depiction of a computing device broken up into subsystems in accordance with one embodiment of the present invention.

FIG. 4 depicts internal components 400 within a system in a computing device, such as server 20, broken up into subsystems in accordance with one embodiment of the present invention. In a stand-alone server, internal components 400 may comprise server 20. If server 20 is a chassis server, internal components 400 may comprise an individual node, module, or blade mounted within the chassis.

In the depicted embodiment, internal components 400 breaks up the hardware components of internal components 400 into a processor subsystem 420, a memory subsystem 440, and an input/output (I/O) subsystem 460. Each respective subsystem contains the hardware components that represent the processor, memory, and I/O (see FIG. 5 for a more in depth discussed of hardware components). Internal components 400 may also include a plurality of temperature sensors 60, such as inlet sensor 410, processor out-sensor 430, memory out-sensor 450, outlet sensor 470, and other temperature sensors (not shown). At least one airflow inlet is present in proximity to inlet sensor 410, and at least one airflow outlet is present in proximity to outlet sensor 470. In addition, cooling fan(s) 70 may be located on or in proximity to internal components 400.

In the depicted embodiment, the hardware components that make up internal components 400 have been organized in such a way that air will enter through the inlet, travel across inlet sensor 410, processor subsystem 420, processor out-sensor 430, memory subsystem 440, memory out-sensor 450, I/O subsystem 460, outlet sensor 470, and then exit through the outlet. As has been previously discussed, simple logic controller 80 may control cooling fan(s) 70 using subsystem temperature gradient data (see both FIG. 2—Stand-alone Function, and FIG. 3—Chassis Function). In the depicted embodiment, subsystem gradient data may include temperature changes between inlet sensor 410 and processor out-sensor 430, between processor out-sensor 430 and memory out-sensor 450, or between memory out-sensor 450 and outlet sensor 470. In another embodiment, subsystem gradient data may include changes in one or more temperature sensor readings, as previously discussed. It should be recognized, that hardware components, subsystems, cooling fan(s) 70 and temperature sensors 60 may be rearranged and reorganized as desired. Additional hardware components and sensors (not shown) may exist on or within internal components 400.

FIG. 5 depicts a block diagram of components of server 20 in accordance with an illustrative embodiment of the present invention. It should be appreciated that FIG. 5 provides only an illustration of one implementation and does not imply any limitations with regard to the environments in which different embodiments may be implemented. Many modifications to the depicted environment may be made.

Server 20 includes communications fabric 502, which provides communications between computer processor(s) 504, memory 506, persistent storage 508, communications unit 510, and input/output (I/O) interface(s) 512. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 514 and cache memory 516. In general, memory 506 can include any suitable volatile or non-volatile computer-readable storage media.

Fan control program 30, stand-alone function 40, chassis function 50, simple logic controller 80, and complex logic controller 90 are stored in persistent storage 508 for execution by one or more of the respective computer processors 504 via one or more memories of memory 506. In this embodiment, persistent storage 508 includes a magnetic hard disk drive. Alternatively, or in addition to a magnetic hard disk drive, persistent storage 508 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 508 may also be removable. For example, a removable hard drive may be used for persistent storage 508. Other examples include optical and magnetic disks, thumb drives, and smart cards that are inserted into a drive for transfer onto another computer-readable storage medium that is also part of persistent storage 508.

Communications unit 510, in these examples, provides for communications with other data processing systems or devices. In these examples, communications unit 510 includes one or more network interface cards. Communications unit 510 may provide communications through the use of either or both physical and wireless communications links. Fan control program 30, stand-alone function 40, chassis function 50, simple logic controller 80, and complex logic controller 90 may be downloaded to persistent storage 508 of server 20 through communications unit 510 of server 20.

I/O interface(s) 512 allows for input and output of data with other devices that may be connected to computing system 10. For example, I/O interface 512 may provide a connection to external devices 518 such as a keyboard, keypad, a touch screen, and/or some other suitable input device. External devices 518 can also include portable computer-readable storage media such as, for example, thumb drives, portable optical or magnetic disks, and memory cards. Software and data used to practice embodiments of the present invention, e.g., fan control program 30, stand-alone function 40, chassis function 50, simple logic controller 80, and complex logic controller 90, can be stored on such portable computer-readable storage media and can be loaded onto persistent storage 508 via I/O interface(s) 512. I/O interface(s) 512 also connect to a display 520.

Display 520 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer program product for designating cooling fan control management in a computing system, the computer program product comprising:
one or more computer-readable storage devices and program instructions stored on the one or more computer-readable storage devices, the program instructions comprising:
program instructions to cause one or more cooling fans to be managed by a first process, wherein the first process utilizes a first set of temperature sensors of a plurality of temperature sensors;
program instructions to receive temperature data from the first set of temperature sensors; and
program instructions to determine a second process to manage the one or more cooling fans, based on the received temperature data from the first set of temperature sensors, wherein:
the second process utilizes a second set of temperature sensors of the plurality of temperature sensors; and
the second process has different energy requirements for managing the one or more cooling fans than the first process.

2. The computer program product of claim 1, further comprising program instructions, stored on the one or more computer-readable storage devices, to cause the one or more cooling fans to be managed by the second process.

3. The computer program product of claim 1, wherein program instructions to determine a second process to manage the one or more cooling fans, based on the received temperature data from the first set of temperature sensors comprise program instructions to determine that the received temperature data from the first set of temperature sensors includes a measurement that exceeds a threshold.

4. The computer program product of claim 1, wherein the first set of temperature sensors comprises a temperature sensor in proximity to an airflow inlet to the computing system and a temperature sensor in proximity to an airflow outlet to the computing system; and
wherein the second set of temperature sensors comprises at least one temperature sensor different from the temperature sensors in the first set of temperature sensors.

5. The computer program product of claim 4, wherein the at least one temperature sensor different from the temperature sensors in the first set of temperature sensors is selected from the group consisting of a temperature sensor in proximity to a random-access memory (RAM) device, a temperature sensor in proximity to a hard drive disk, a temperature sensor in proximity to a power supply unit, a temperature sensor on the RAM device, a temperature sensor on a hard disk drive, and a temperature sensor on a power supply unit.

6. The computer program product of claim 1, wherein the first process and the second process operate on separate controllers.

7. The computer program product of claim 1, further comprising:
program instructions, stored on the one or more computer-readable storage devices, to receive an indication that the second process is not properly functioning; and
program instructions, stored on the one or more computer-readable storage devices, to manage the one or more cooling fans using the first process in response to receiving an indication that the second process is not properly functioning.

8. The computer program product of claim 1, wherein program instructions to receive the temperature data from the first set of temperature sensors comprises:
program instructions to receive temperature data from each temperature sensor of the first set of temperature sensors.

9. The computer program product of claim 1, wherein:
the first process monitors the first set of temperature sensors at a first frequency; and the second process monitors the second set of temperature sensors at a second frequency.

10. The computer program product of claim 1, wherein the temperature data comprises a change in temperature between two temperature sensors of the first set of temperature sensors.

11. A computer system for designating cooling fan control management in a computing system, the computer system comprising:
   one or more computer processors, one or more computer-readable storage media, and program instructions stored on the computer-readable storage media for execution by at least one of the one or more processors, the program instructions comprising:
   program instructions to cause one or more cooling fans to be managed by a first process, wherein the first process utilizes a first set of temperature sensors of a plurality of temperature sensors;
   program instructions to receive temperature data from the first set of temperature sensors; and
   program instructions to determine a second process to manage the one or more cooling fans, based on the received temperature data from the first set of temperature sensors, wherein:
      the second process utilizes a second set of temperature sensors of the plurality of temperature sensors; and
      the second process has different energy requirements for managing the one or more cooling fans than the first process.

12. The computer system of claim 11, further comprising program instructions, stored on the computer-readable storage media for execution by at least one of the one or more processors, to cause the one or more cooling fans to be managed by the second process.

13. The computer system of claim 11, wherein program instructions to determine a second process to manage the one or more cooling fans, based on the received temperature data from the first set of temperature sensors comprise program instructions to determine that the received temperature data from the first set of temperature sensors includes a measurement that exceeds a threshold.

14. The computer system of claim 11, wherein the first set of temperature sensors comprises a temperature sensor in proximity to an airflow inlet to the computing system and a temperature sensor in proximity to an airflow outlet to the computing system; and
   wherein the second set of temperature sensors comprises at least one temperature sensor different from the temperature sensors in the first set of temperature sensors.

15. The computer system of claim 14, wherein the at least one temperature sensor different from the temperature sensors in the first set of temperature sensors is selected from the group consisting of a temperature sensor in proximity to a random-access memory (RAM) device, a temperature sensor in proximity to a hard drive disk, a temperature sensor in proximity to a power supply unit, a temperature sensor on the RAM device, a temperature sensor on a hard disk drive, and a temperature sensor on a power supply unit.

16. The computer system of claim 11, wherein the first process and the second process operate on separate controllers.

* * * * *